UNITED STATES PATENT OFFICE.

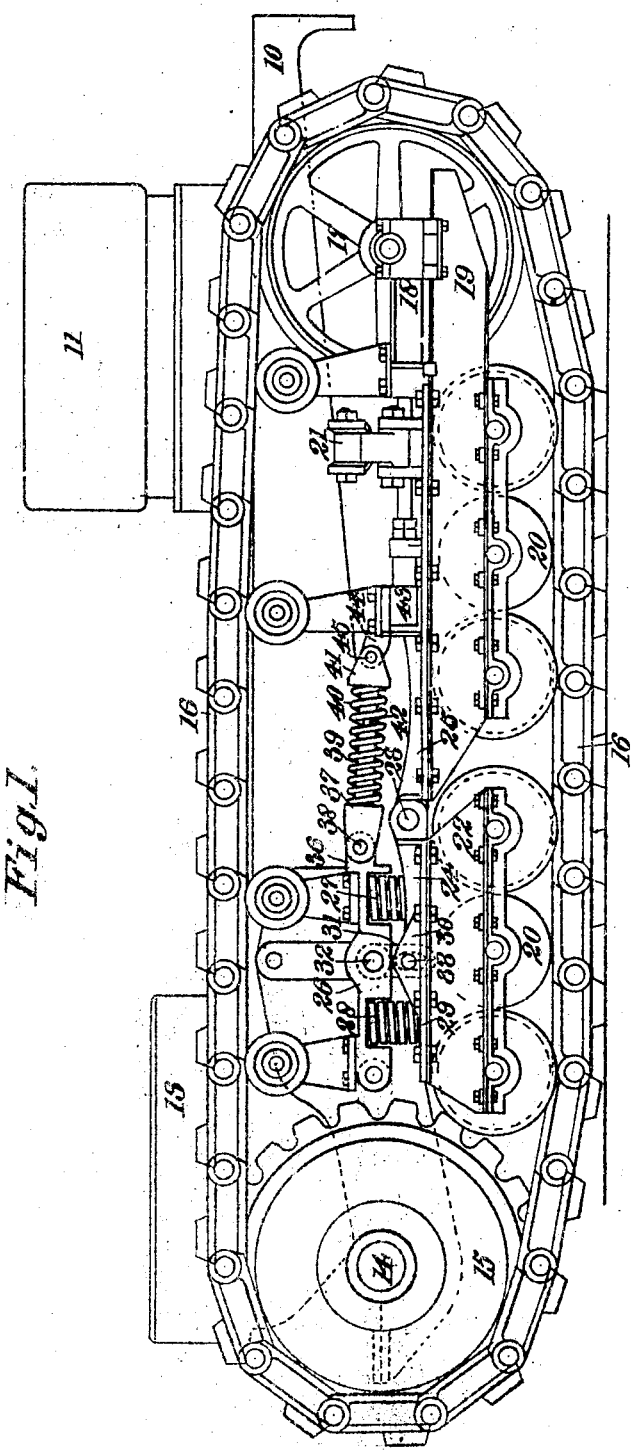

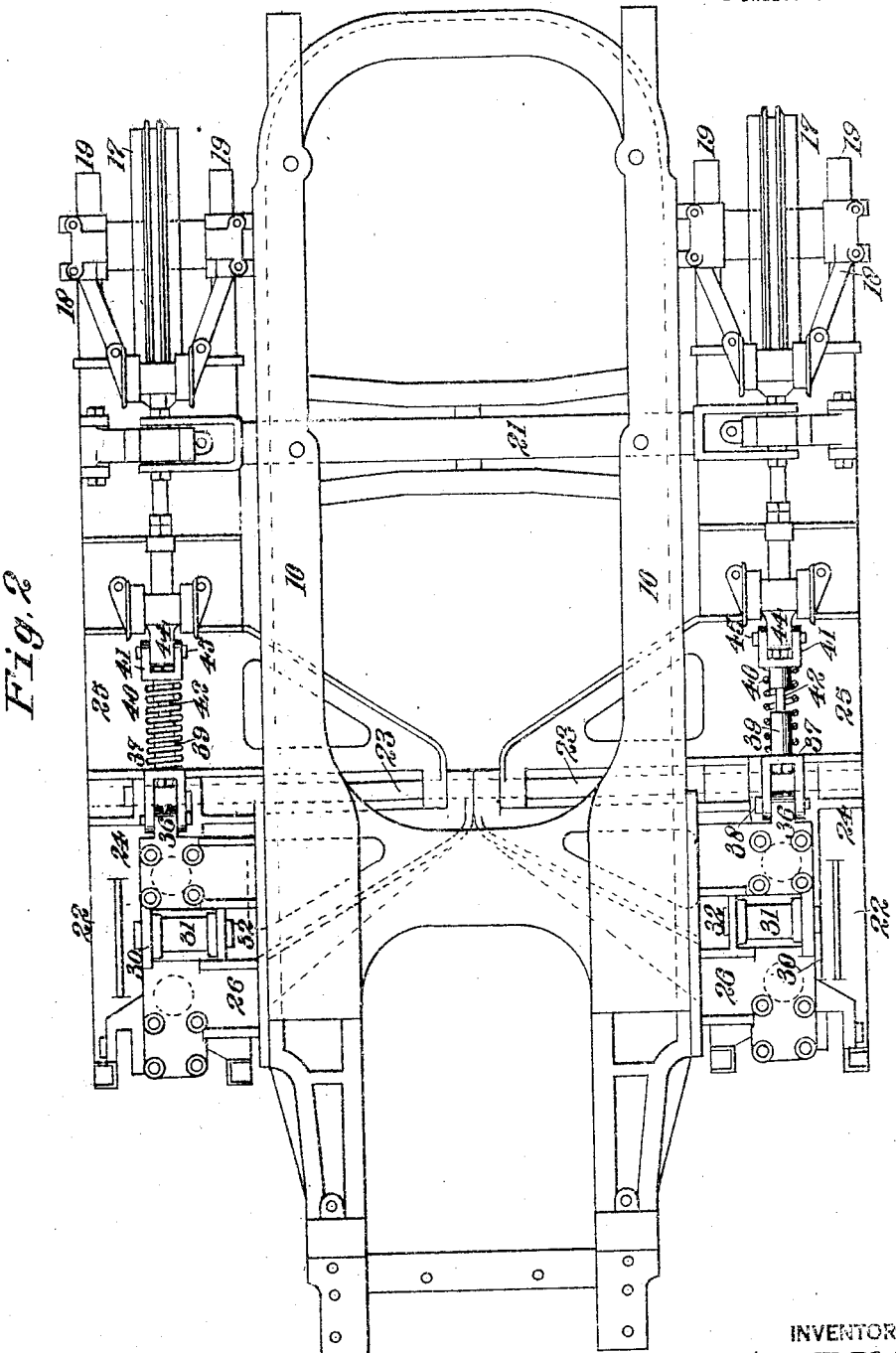

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR-TRUCK CONSTRUCTION.

1,394,996.

Specification of Letters Patent.  Patented Oct. 25, 1921.

Application filed April 16, 1919. Serial No. 290,431.

*To all whom it may concern:*

Be it known that I, PLINY E. HOLT, a citizen of the United States, residing at Stockton, in the county of San Joaquin and State of California, have invented new and useful Improvements in Tractor-Truck Constructions, of which the following is a specification.

This invention relates to tractors of the self-laying track type and has for its object to provide a self-laying track mechanism for tractors of this type, which will automatically adjust itself when obstructions occur between the track and the wheels around which it moves or when inequalities are encountered in the surface traveled over, and will thus prevent excessive binding or tightening of the track under these circumstances.

In the present invention this is accomplished by employing the usual main frame with an endless flexible track, a drive sprocket for said track journaled on the main frame and carrying one end of the track, and an idler journaled on a roller truck frame, carrying the other end of the track, the roller truck frame being provided with rollers engaging the ground run of the track. Suitable means are provided to support the main frame on the roller truck frame, and means are also provided to transmit horizontal movement of the main frame to the roller truck frame in such a manner that limited horizontal movement of the roller truck frame in relation to the main frame will be permitted when excessive tension in the track occurs.

The track drive sprocket and idler sprocket are thus permitted to approach each other, thereby producing sufficient slack in the track to prevent undue strains when obstructions find their way between the track and the wheels about which it moves or when inequalities are encountered in the surface traveled over.

Referring to the drawings, Figure 1 is a view in side elevation, illustrating a truck unit and the main frame supported thereby.

Fig. 2 is a view in plan, illustrating the main frame and the truck units at the opposite sides thereof.

Referring more particularly to the drawings, 10 indicates a main frame upon which is mounted a suitable power plant 11 and a transmission mechanism 13. The main frame 10, as is here shown, is a single casting and provides a suitable support for a rear axle 14. This general construction, as well as certain details of the truck structure, have been more fully disclosed in a co-pending application entitled "Chain track tractor," filed May 25, 1918, and bearing the Serial No. 236,523. The axle 14 is fitted with chain track supports 15 around which an articulate track 16 is led. This track also embraces idler wheels 17, disposed near the forward end of the main frame and carried in bearings 18 mounted upon front truck sections 19. The front truck sections are fitted with a plurality of load supporting rollers 20, adapted to pass along the lower run of track and are rotatably secured beneath these sections. Near the forward end of the truck sections 19 is disposed an equalizer bar 21, which passes across and beneath the main frame and is centrally pivoted thereto, the outer ends of said bar being pivoted to the truck units at the opposite sides of the main frame. The rear end of the forward truck units 19 are connected with rear truck units 22 by means of hinge pins 23. These pins extend horizontally through hinge castings 24 and 25, fastened upon the rear and front truck sections respectively. By means of this connection, the complementary sections of each truck unit may move vertically in relation to each other. The main frame is formed with an outrigger casting 26, which extends from each side of the frame and is designed with seats to receive the upper ends of load supporting springs 27 and 28. These springs rest upon a top plate 29, forming a part of the rear truck structure and which also carry a pair of upwardly extending lugs 30. These lugs are spaced in relation to each other and extend longitudinally of the truck sections 22, thus accommodating the lower ends of a link member 31. This link hangs downwardly from its pivot pin 32 upon the outrigger casting and is formed with an elongated slot through which a truck pin 33 extends. The width of the link is such that the truck sections 22 will be held against transverse horizontal twisting movement. At the same time the slot will allow the truck sections to move vertically, as desired and in a freely floating manner. The rear trucks are, of course, fitted with load supporting rollers 20, as previously described, and rest upon the lower run of track, and due to this floating connection between these trucks and the main frame, it is possible for the track to readily adapt itself to the contour of the roadway over which it passes.

A forwardly projecting lug 36 is formed as a part of each outrigger casting and is intended to receive a shackle member 37. This member is pivoted thereto by means of a shackle pin 38. The shackle possesses a tubular shank 39 extending partially through a helical spring 40. At the opposite end of this spring is a second shackle member 41, carrying a stem 42 which is free to slide within the central opening of the member 39. This second shackle is pivoted to a casting 43, carried by the front truck sections 19 and is directly attached to a lug 44 by means of a shackle pin 45. An examination of the drawing will disclose the fact that the two shackles may move toward or away from each other as the stem 42 telescopes within the tubular member 39, this action being dependent upon the expansion and contraction of the spring 40 which is interposed between the shoulders of the shackles 37 and 41. It will also be noted that the cushion structure comprising the shackles and their spring is pivotally connected across the hinge connection between the truck sections, thus acting to yieldably resist the upper movement of the opposite ends of the truck sections 19 and 22 and at the same time allowing the trucks to collapse in the event that the track becomes excessively tight, due to any condition.

In reviewing the action, made possible by the structure embodied in the present invention, it will be noted that the front and rear truck sections may move vertically in unison; that the front section may move vertically as it pivots upon a hinge pin 23 and as equalized by the cross member 21. Furthermore, the rear section may pivot upon the hinge pin 23 as permitted by the compression of the springs 27 and 28. At the same time a collapsing action may be produced between the two truck sections, due to the compression of the spring 40, thus providing a truck which will constantly maintain the track in a proper tensioned condition and at the same time will permit the truck to collapse to accommodate the track when excessive strains are produced.

Having thus described my invention, what I claim and desire to secure by Letters Patent is—

1. In a chain track tractor, a main frame, an endless flexible track having one end supported on a track driving sprocket journaled on the main frame and the other end supported on an idler journaled on a roller truck frame, rollers on the truck frame, engaging the ground run of the track, means to support the main frame on the roller truck frame, and resilient means to transmit horizontal movement of the main frame to the roller truck frame.

2. In a chain track tractor, a main frame, an endless flexible track having one end supported on a track driving sprocket journaled on the main frame and the other end supported on an idler journaled on a roller track frame, rollers on the truck frame engaging the ground run of the track, means to support the main frame on the roller truck frame, and means to normally maintain the roller truck frame in proper position under the main frame while permitting limited horizontal movement of the roller truck frame in relation to the main frame when excessive tension is applied to the track.

3. In a chain track tractor, a main frame, an endless flexible track having one end supported on a track driving sprocket journaled on the main frame and the other end supported on an idler journaled on a roller truck frame, rollers on the truck frame engaging the ground run of the track, means to support the main frame on the roller truck frame, and means interposed between the main frame and the roller truck frame in a manner to permit the idler to approach the track drive sprocket and produce slack in the track.

4. In a chain track tractor, a main frame, an endless flexible track having one end supported on a track driving sprocket journaled on the main frame and the other end supported on an idler journaled on a roller truck frame, rollers on the truck frame engaging the ground run of the track, means to support the main frame on the roller truck frame, and means interposed between the main frame and the roller truck frame in a manner to permit the idler to approach the track drive sprocket and produce slack in the track, said means comprising a spring thrust link having one end secured to the main frame and the other secured to the roller truck frame.

5. In a chain track tractor, a main frame, an endless flexible track having one end supported by a track drive sprocket journaled on the main frame and the other supported on an idler journaled on an articulated roller truck frame, rollers for the truck frame engaging the ground run of the track, resilient means to support the main frame upon the roller truck frame, and means interposed between the main frame and the roller truck frame in a manner to permit the idler to approach the track drive sprocket and produce slack in the track, said means comprising a spring thrust link having one end secured to the main frame and the other secured to the forward section of the roller truck frame.

6. In a tractor, a driving sprocket rotatably fixed to the tractor main frame, a pair of truck sections hinged together and disposed in alinement with said driving sprocket, an idler wheel carried by the forward section, a chain tread track embracing said sprocket and idler wheels and the truck sections, means for yieldably suspending the main frame from said front and rear truck sections and resilient means adapted to yieldingly resist a hinging action between the two sections.

7. In a tractor construction, a main frame, a driving axle carried by the rear end thereof, driving sprockets upon the opposite ends of said axle, a freely movable truck section, means for yieldably supporting the rear end of the main frame from said truck section, a freely movable truck section pivoted to said first named section, means for supporting the forward and of the main frame from said section, an idler wheel carried by the front section, a chain track embracing the trucks and the idler and sprocket wheels and yieldable means interposed between the front truck section and the main frame for normally resisting a hinged action of the front and rear sections in relation to each other.

In testimony whereof I have hereunto set my hand in the presence of two subscribing witnesses.

PLINY E. HOLT.

Witnesses:
W. W. HEALEY,
M. E. EWING.